United States Patent [19]

Gusmer et al.

[11] 4,154,368

[45] May 15, 1979

[54] FEEDER FOR APPARATUS FOR EJECTING A MIXTURE OF A PLURALITY OF LIQUIDS, WITH HEATED HOSES

[75] Inventors: Frederick E. Gusmer; Denis S. Commette, both of Mantoloking; Robert A. Bairunas, Bordentown, all of N.J.

[73] Assignee: Gusmer Corporation, Lakewood, N.J.

[21] Appl. No.: 832,523

[22] Filed: Sep. 12, 1977

Related U.S. Application Data

[62] Division of Ser. No. 727,981, Sep. 29, 1976.

[51] Int. Cl.² .............................................. B67D 5/62
[52] U.S. Cl. .................................. 222/135; 219/307; 219/309; 222/146 HE
[58] Field of Search ............... 219/307, 374, 381, 308, 219/309, 296; 222/146 R, 146 HE, 135; 137/341

[56] References Cited

U.S. PATENT DOCUMENTS

| | | | |
|---|---|---|---|
| 2,669,299 | 2/1954 | Roach | 219/307 |
| 2,716,179 | 8/1955 | Cornella | 219/307 |
| 3,263,932 | 8/1966 | Ruland | 222/135 X |
| 3,614,389 | 10/1971 | Malisza | 222/146 HE X |
| 3,976,230 | 8/1976 | Sperry | 222/146 HE |
| 4,034,203 | 7/1977 | Cooper | 219/307 X |

Primary Examiner—David A. Scherbel
Attorney, Agent, or Firm—Young & Thompson

[57] ABSTRACT

A feeder for apparatus for ejecting a mixture of liquids, e.g. urethane foam, comprises a pair of swash plate proportioning pumps one individual to each of the liquids, e.g. resin and isocyanate, each proportioning pump being fed by a gear pump from a supply of the respective liquid. Seepage along the drive shafts of the isocyanate pumps is continuously removed by bathing them in a recirculating stream of flushing agent. The swash plate and gear pumps and flushing agent pump are all driven by a single motor from a common chain drive. The liquids are heated during passage through separate hoses to a common dispensing head or gun, by immersed coil electric resistance heaters extending lengthwise freely within the hoses. A novel control system is provided for the hose heater circuit, the adequacy of the liquid supply and other operating conditions.

7 Claims, 9 Drawing Figures

FEEDER FOR APPARATUS FOR EJECTING A MIXTURE OF A PLURALITY OF LIQUIDS, WITH HEATED HOSES

This is a division of application Ser. No. 727,981, filed Sept. 29, 1976.

The present invention relates to a feeder for feeding a plurality of liquids to apparatus for ejecting a mixture of that plurality of liquids. Apparatus to be fed by the feeder of the present invention can for example be of the type disclosed and claimed in U.S. Pat. Nos. 2,890,836, 3,263,928 and 3,876,145, the disclosure of which is incorporated herein by reference. It is to be emphasized, however, that the present invention is not an improvement on or an alternative to the claimed subject matter of those patents, but rather is for use with apparatus such as the apparatus of those patents and with other such apparatus for receiving a plurality of separate streams of liquid and for mixing liquids together and ejecting a mixture of that plurality of liquids.

Accordingly, it is an object of the present invention to provide a feeder for apparatus for ejecting a mixture of a plurality of liquids, with improved means to heat the liquids and to control the heating of the liquids.

Another object of the present invention is to provide such a feeder, which, when one of the liquids is an isocyanate component of a polyurethane system, has improved means for avoiding the undesirable effects of the escape of isocyanate.

A further object of the present invention is the provision of such a feeder, which automatically guards against operation with an inadequate supply of any fed liquid.

A still further object of the present invention is the provision of such a feeder with improved controls responsive to the pressure of the fed liquids at a plurality of points in the system.

Still another object of the present invention is the provision of such a feeder with an improved drive means therefor.

Finally, it is an object of the present invention to provide such a feeder which will be relatively simple and inexpensive to manufacture, adjust, operate, maintain and repair, and rugged and durable in use.

Other objects, features and advantages of the present invention will become apparent from a consideration of the following description, taken in connection with the accompanying drawings, in which.

OVERALL CONFIGURATION

Figure 1:
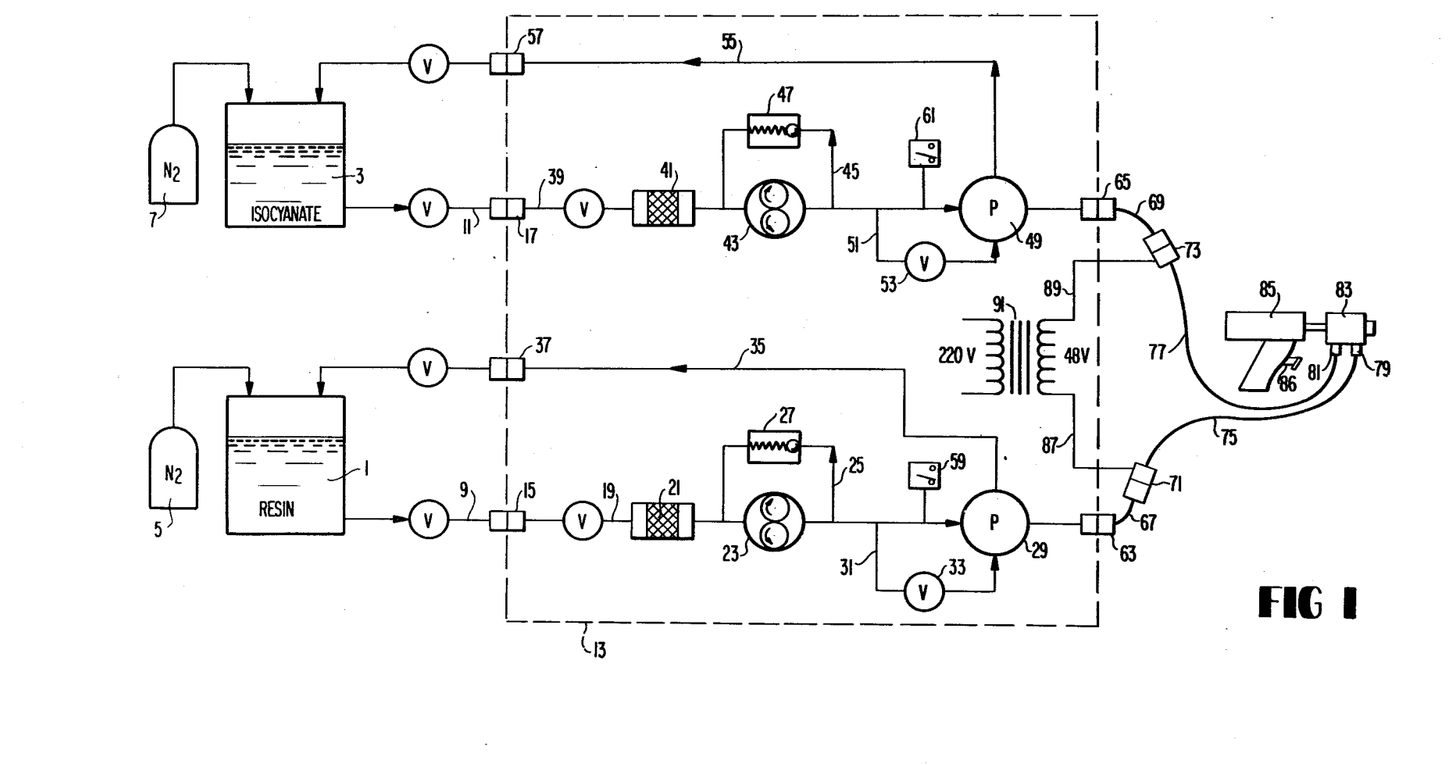
FIG. 1 is a schematic overall diagram of apparatus according to the present invention.

Referring now to the drawings in greater detail, and first to FIG. 1, an embodiment of the present invention is illustrated which comprises a feeder for two mutually reactive liquids, namely, a urethane resin and an isocyanate hardener therefor, of conventional composition. The resin in liquid phase is contained in a supply container 1; while the isocyanate in liquid phase is contained in a supply container 3. Sources of nitrogen under pressure, at 5 and 7, respectively, protect the liquids against air and moisture and ensure that the liquids will leave their respective supply containers at a small positive pressure, for example 3 psig or less. The use of nitrogen in this fashion, however, is entirely conventional.

The mutually reactive liquids separately leave their respective containers and pass through conduits 9 and 11, respectively, to machine 13, to which conduits 9 and 11 are detachably interconnected by conventional couplings 15 and 17, respectively. Machine 13 comprises a frame on which are mounted the motor and pumps which, apart from the material supply containers and the hoses to the dispensing gun itself, constitute the principal portions of the invention, and to which the supply containers and gun hoses are detachably interconnected by means of flexible conduits.

Machine 13 thus may comprise a base plate on which are mounted various principal components of the invention, and which may in turn be mounted on wheels for easy transportation. On machine 13, the resin supply proceeds through conduit 19 and filter 21 to a resin feed pump 23 which is a gear pump in which the pressure of the resin is raised from, for example, 3 psi to, for example, 20 psi. A bypass 25 under control of a spring-urged pressure relief valve 27 limits the pressure in conduit 19 downstream of pump 23. Bypass 25 is diagrammatically shown in FIG. 1 as a bypass conduit, but it will be understood that it can be merely a bypass orifice within pump 23.

From feed pump 23, the resin passes to a positive displacement proportioning pump 29 which is adjustable to set the proportion of resin-to-isocyanate within a range of, say, 1:3 to 3:1. A bypass conduit 31 under control of a manually operated valve 33 permits resin in conduit 19 upstream of pump 29 to be selectively diverted through the casing of pump 29 and thence through a return conduit 35 past detachable coupling 37 and back to container 1.

Similarly, on the isocyanate side, the liquid proceeds from coupling 17 through conduit 39 and filter 41, to isocyanate feed pump 43 with its bypass 45 controlled by pressure relief valve 47. Bypass 45, like bypass 25, can be merely a bypass orifice in pump 43.

Isocyanate from feed pump 43 at a pressure of, say, 25 psi, proceeds to proportioning pump 49 which, like pump 29, is a rotary cylinder multiple piston type swash plate pump with a bypass conduit 51 under control of a manually operated valve 53 that returns liquid through the casing of pump 49 to return conduit 55 and thence through detachable coupling 57 to isocyanate container 3.

Feed pumps 23 and 43 thus maintain a base pressure, for example at least about 15 psig, upstream of the proportioning pumps 29 and 49. Pressure-actuated switches 59 and 61, in conduits 19 and 39, respectively, immediately upstream of pumps 29 and 49, respectively, are responsive to a decrease in pressure to a value below this base pressure, which is indicative of low material supply, and which serves to control the machine in a manner to be described in greater detail hereinafter.

The resin and isocyanate, now under a pressure of, say, 800 psig, leave their respective proportioning pumps and leave machine 13 through couplings 63 and 65, respectively, and proceed through short lengths of unheated hose 67 and 69 to couplings 71 and 73, whence they pass through heated hoses 75 and 77 to conventional couplings 79 and 81 by which the hoses 75 and 77 are respectively secured to a conventional head 83 of a conventional gun 85. Gun 85 can be of the entirely conventional type in which a valving rod is reciprocated to open and close a mixing chamber fed by inlets for the various liquids, the valving rod being reciprocated by an air piston whose air supply is under the control of a trigger valve 86.

Couplings 71 and 73 are in electrical circuit via conductors 87 and 89, with the secondary winding of an isolation transformer 91, in which the primary voltage of, say, 220 volts is stepped down to 48 volts, this latter then passing in series from one of the couplings 71 and 73 through conductors that extend within the hoses 75 and 77 full length thereof, through the couplings 79 and 81 and the head 83 of gun 85, thereby to heat the resin and isocyanate by means of an immersed electrical resistance heater in a manner that will be described in greater detail hereinafter.

FLUSH SYSTEM FOR ISOCYANATE PUMPS

In the case of a urethane system in which the isocyanate is separately pumped to the gun, a problem arises with the pumps 43 and 49, which are rotary pumps driven by a shaft. Pump 43, a gear pump, has one drive shaft, which drives one of the gears, the other gear being a slave. Pump 49, which is a swash plate pump, has a drive shaft which rotates the cylinder in which the plural pistons reciprocate parallel to the axis of the shaft. In each case, however, the drive shaft must be sealed in an effort to prevent the escape of isocyanate along the drive shaft, as the isocyanate is hygroscopic and tends to thicken and gum in the presence of atmospheric moisture, so that an isocyanate gum builds up on the shaft; and this damages the pump seals. Thus, a very serious problem in pumping isocyanate has been the problem of how to hold a seal when isocyanate is pumped to high pressure.

It is known to bathe the drive shaft of a rotary pump used in connection with isocyanate, with a diluent for the isocyanate. But according to the present invention, the diluent is pumped in a closed circuit, to bathe the drive shafts of the pumpes 43 and 49. The use of diluent or flush liquid pumped in a closed circuit has two principal advantages over the use of a bath as in the prior art: in the first place, the pumped diluent is under positive pressure and so precludes the entry of atmospheric air with its charge of moisture; and in the second place, the diluent continuously circulates, thereby continuously to dilute and carry away the isocyanate that continuously leaks past the ordinary pump seals and toward the atmosphere.

Figure 2:
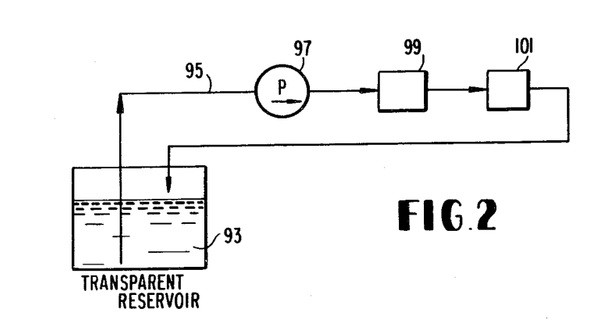
FIG. 2 is a schematic diagram of the fluid circuit for avoiding undesirable results arising from the escape of isocyanate in the case of a urethane system.
Figure 3:
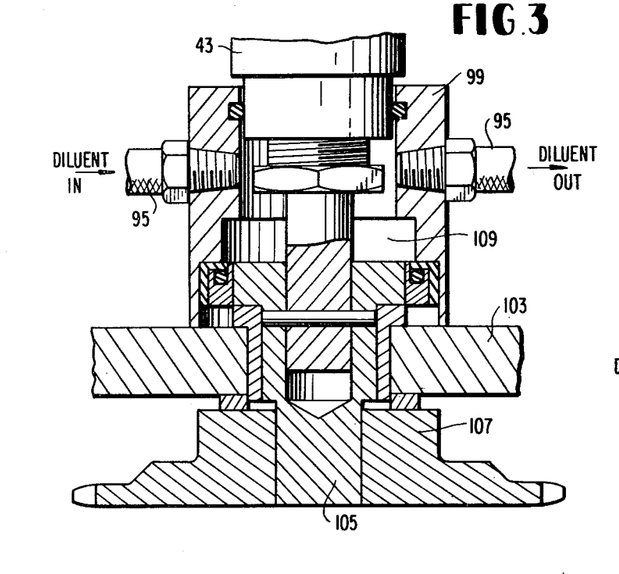
FIG. 3 is a fragmentary cross-sectional view of a gear feed pump as used in the invention, modified to control the escape of isocyanate.
Figure 4:
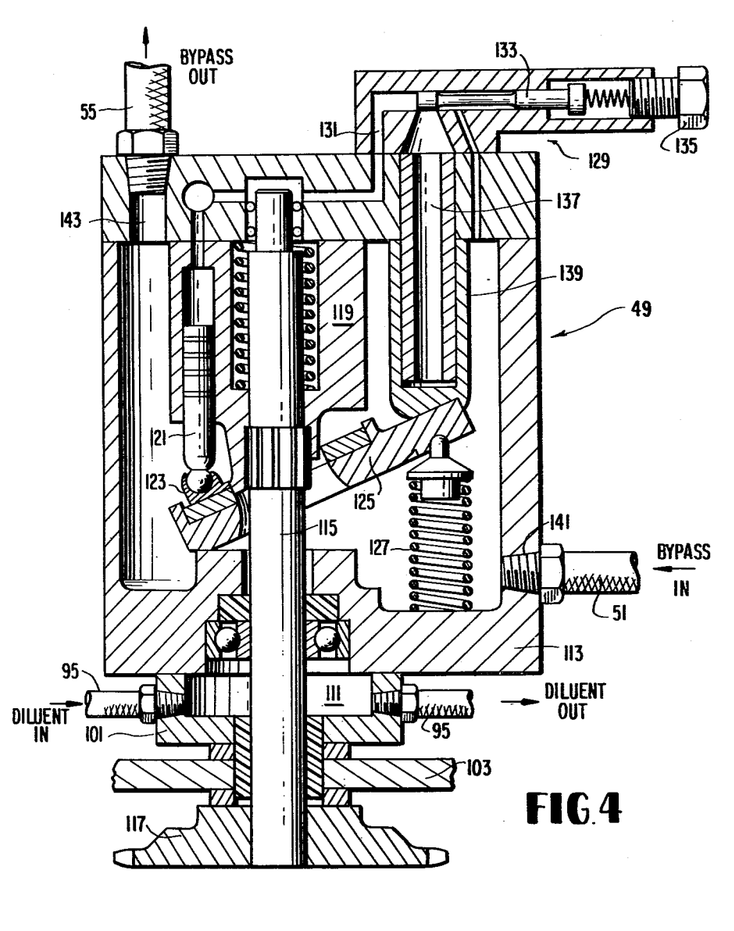
FIG. 4 is a cross-sectional view of a swash plate proportioning pump as used in the present invention, modified for controlling the escape of isocyanate.

Such a closed circuit is shown in FIG. 2 in which diluent in a transparent reservoir 93 is pumped through conduit 95 by a small gear pump 97, to the casing 99 that surrounds the drive shaft of gear pump 43 (see FIG. 3), and then through the casing 101 that surrounds the drive shaft of a proportioning pump 49 (see FIG. 4).

The system of FIG. 2 is shown as a series system, from pump 43 to pump 49. However, it could of course be also a parallel closed system.

Suitable diluents are tricresyl phosphate, mineral oil, dioctyl phthalate, and other known diluents. Particularly preferred is tricresyl phosphate (TCP), because the TCP that is commercially available tends to contain less water than the other known diluents. Water is undesirable, because it reacts with the escaping isocyanate to cause the diluent to thicken or gel. Thanks to the fact that the diluent circulates in a closed system under positive pressure, there will be no intrusion of water from the ambient atmosphere; and so the water that is present will be that which was initially present in the diluent.

There will thus be a progressive build-up of isocyanate in the TCP. This build-up should not be permitted to proceed beyond a certain proportion of isocyanate in the TCP, say, 10%. TCP and the other diluents are clear, while isocyanate is very dark brown. Hence, the build-up of isocyanate can be visually monitored, for when the TCP turns brown from isocyanate, then it is time to change the TCP in reservoir 93. The fact that reservoir 92 is transparent makes possible an easy visual check on the condition of the TCP.

It has been found that a closed diluent system as shown in FIG. 2 need contain only about one quart total diluent and need have a flow rate of only about 1½ quarts per minute, at a pressure which need not exceed 6 psi gauge.

Referring now in greater detail to FIG. 3, which shows the mounting of the drive end of the gear pump 43, it will be seen that pump 43 is mounted on base plate 103 of the machine, the drive shaft 105 of pump 43 extending through an opening in base plate 103 and having fixedly secured to its free end a drive sprocket 107. Casing 99 thus defines an annular chamber 109 that surrounds drive shaft 105 and that is sealed with the casing of pump 43 and with drive shaft 105. Shaft 105 is sealed and mounted on base plate 103, also with conventional bearings and seals. The diluent thus passes through conduit 95 into and through chamber 109 and out through conduit 95 on its way to casing 101 of proportioning pump 49, thereby continuously to bathe the drive shaft 105 and to dilute and carry away the isocyanate that inevitably leaks past shaft 105, and also to exclude moisture from chamber 109 by the positive pressure of the pumped diluent.

Turning now to FIG. 4, the path of the diluent will be seen through conduit 95 and casing 101, which defines an annular chamber 111 against the underside of the casing 113 of pump 49. Chamber 111 surrounds drive shaft 115 of pump 49, which passes through base plate 103 in which it rotates and on which pump 49 is mounted, by means of bearings and seals which are entirely conventional and need not be described in greater detail. At its free end, shaft 115 has a drive sprocket 117; or shaft 115 can be connected to sprocket 117 through a coupling and bearing arrangement as in FIG. 3. Thus, in the case of pump 49, as also in the case of pump 43, isocyanate that inevitably leaks past the bearings and seals that are provided in ordinary commercial practice for the pump, is continuously diluted and carried away by the diluent; and also, again, the positive pressure of the pumped lubricant excludes airborne moisture.

THE PROPORTIONING PUMPS

As indicated above, the proportioning pumps 29 and 49 are swash plate pumps of the type in which a rotary drive shaft rotates a cylinder provided with a peripheral series of pistons that press slidably against an inclined swash plate, and whose sliding movement against the swash plate causes the pistons to be advanced into and retracted from the cylinder, thereby to effectuate the pumping action. The pumps 29 and 49 of the present invention may be readily available commercial units that have been modified as described above and that in many ways operate exactly as do other swash plate pumps known to the art. Thus, in common with other known swash plate pumps, the drive shaft 115 of pumps 29 and 49 rotates in conventional seals and bearings in its casing 113 and drives in rotation a cylinder 119 that mounts a peripheral series of pistons 121, that might for example be nine in number, that slide via slippers 123 on a conventional inclined swash plate 125 that is mounted for swinging movement in casing 113 about an axis that is perpendicular to the plane of FIG. 4. A coil compression spring 127 urges swash plate 125 toward a more steeply inclined position; while a conventional pressure compensator 129 urges swash plate 125 in the opposite direction upon the attainment of a downstream pressure in excess of a predetermined maximum pressure above working pressure.

Thus, as is conventional, upon attainment of said maximum pressure in passageway 131, as for example when the gun is closed and there is a no-flow condition but pump 49 continues to operate, piston 133 is forced to the right, against a spring pressure set by adjustment of nut 135, thereby subjecting chamber 137 to that maximum pressure, whereupon piston 139 is forced down as shown in FIG. 4, to swing swash plate 125 clockwise as seen in FIG. 4 toward a position in which swash plate 125 is perpendicular to shaft 115, this latter position being an idle or no-flow position in which the pistons 121 do not move relative to cylinder 119 and so no pumping takes place.

It will of course be understood that the pressure compensator 129 is not the pressure setting means of the present invention. The pessure of the pump components, that is, the back pressure downstream of pumps 29 and 49, is preferably set in the gun head 83 itself. Instead, pressure compensator 129 operates to move the swash plate toward the idle position, only at a maximum pressure above the working pressure. Thus, for example, if a working pressure of, say, 800 psi is used, then compensator 129 might be set to open at, say, 1000 psi. The maximum pressure at which compensator 129 is set should be sufficiently high above the operating pressure that small variations in working pressure do not trigger swinging movement of swash plate 125, which would alter the proportion of one component relative to the other and/or stop the machine; at the same time, the maximum pressure should not be greatly above the working pressure, because when changing from a no-flow to a flow condition, there would be too great a spurt of liquid when the pressure drops from the maximum pressure that obtains under no flow conditions, to the working pressure that obtains under flow condition.

But in addition to their more conventional aspects, pumps 29 and 49 have a number of features of novelty that enter into patentable combination in the present invention, as follows:

1. The present invention uses plural swash plate pumps in parallel liquid circuits that ultimately have a common outlet. In this particular combination, swash plate pumps provide certain advantages never before achieved by the gear pumps and reciprocating pumps that have heretofore been used in this particular environment. Thus, a swash plate pump provides positive displacement and so, when plural swash plate pumps are used, permits positive control of the proportions of the components relative to each other. Moreover, a swash plate pump provides ready means for relieving overpressure by swinging to no-flow condition, without necessarily stopping the pump upon no-flow condition. Moreover, the use of plural swash plate pumps in parallel, for the pumping of parallel streams, enables the ratio of the flow rates of the streams to be quickly and easily adjusted relative to each other, merely by adjusting the maximum angle to which the swash plate can swing, by means of conventional adjusting means that are already present on commercially available swash plate pumps. In this latter regard, swash plate pumps are superior to gear pumps, in which change of ratio must be effected either by the change of speed of one pump, or by the change of gear ratio of one pump, either of which adjustments is quite costly to provide. Swash plate pumps are superior to piston pumps as heretofore used for the pumping of parallel streams, because piston pumps have a pressure cycle which is cyclic per stroke; and so the pressure ratio of the two streams tends to vary instantaneously; while by contrast, a swash plate pump, by virtue of its series of pistons, is essentially free from cyclic pressure variation, so that the pressure ratio of the streams can be maintained essentially constant, not only on the average, but also instantaneously.

2. As will be explained in greater detail hereinafter, exhaustion of the supply of either component results in a pressure drop below the base pressure of, say, 15 psig, which in turn results in stoppage of the machine, so that the machine will not pump off-ratio. The exhaustion of one component, however, introduces air into the liquid circuit for the exhausted component. If this air were pumped through upon resumption of operation, that is, after replenishment of the exhausted component, then the resulting mixture would be off-ratio, and also the pumps would lose their prime.

Therefore, the swash plate pumps 29 and 49 of the present invention are specially arranged and their fluid circuits are modified, to purge air from the system and to re-establish the integrity of the all-liquid circuit of what was previously the exhausted component. Thus, upon component replenishment and prior to the resumption of operation, the manually operated valve 33 or 53 is opened, whereby the replenished component moves through the bypass conduit 31 or 51 into a bypass inlet 141 in the bottom of casing 113, and out through a bypass outlet 143 in the top of casing 113. For this purpose, therefore, casing 113 is arranged upright, so that the axis of drive shaft 115 is vertical and the intake and exhaust passages (not shown in FIG. 4 as they are conventional) of pumps 29 and 49 are disposed uppermost.

For this purpose, the gun is closed and both of pumps 23 and 29, or 43 and 49, are operated with the associated valve 33 or 53 open, whereupon the liquid moves through bypass conduit 35 or 55 and carries with it the purged air back to the associated reservoir 1 or 3.

Once the integrity of the all-liquid circuit has been reestablished, then manually operated valve 33 or 53 is closed and on-ratio pumping can resume.

3. As indicated above, it is conventional to provide a manually adjustable control for the angle to which the swash plate 125 may swing, thereby to regulate the delivery of the pump. But the present invention adds a new function, and some new structure, to the function and structure of this portion of commercially available swash plate pumps.

Figure 5:
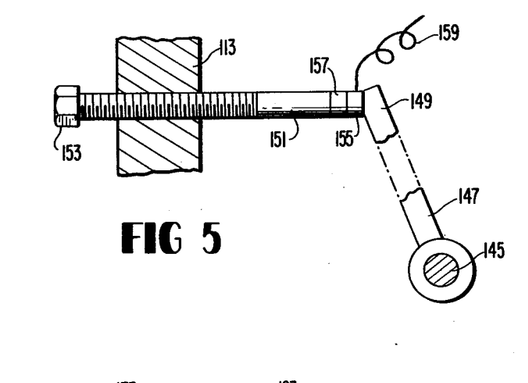
FIG. 5 is a fragmentary view showing the circuit control responsive to the angle of the swash plate of the proportioning pumps.

Such an arrangement can be seen in FIG. 5, which shows the shaft 145 on which the swash plate 125 is mounted on casing 113 for oscillating movement (vertical swinging movement as seen in FIG. 4) between flow and no-flow conditions. Fixedly secured to shaft 145 is an arm 147 that extends radially from shaft 145, and that at its free end 149 is adapted to bear against a rod 151 which is mounted on casing 113 for adjustive movement in either direction.

Thus far, the structure and function of this portion of the pump 29 or 49 as seen in FIG. 5 are conventional. But the present invention adds new structure and function, by means of an electrical contact 155 that is mounted on the free end of rod 151 by means of an insulator 157, whereby contact 155 is insulated from rod 151. Contact 155 is in an electrical circuit whose details will be described hereinafter, through a conductor 159. Casing 113 of pumps 29 and 49 is grounded, so that arm 147 is grounded. Thus, an electrical circuit through contact 155 and conductor 159 is respectively established and interrupted, when arm 147 swings counterclockwise or clockwise as seen in FIG. 5. As FIG. 5 is presented, end 149 of arm 147 bears against contact 155 to complete this circuit, in the flow condition, and is spaced from contact 155 to interrupt this circuit, in the no-flow condition. This circuit features serves, among other things, to control the heating of the pumped streams, and the operation of the motor, in a manner that will be disclosed in greater detail hereinafter.

PUMP DRIVES

Figure 6:
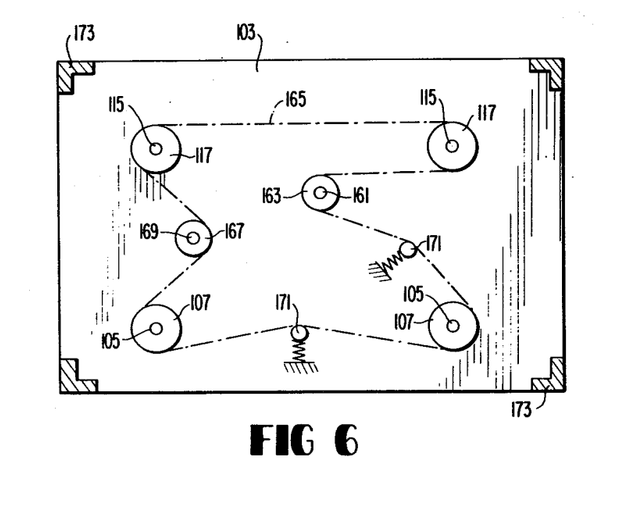
FIG. 6 is a bottom plan view of the machine showing the common drive of the moving parts.

As indicated above, there are five pumps 23, 29, 43, 49 and 97, comprising the feed pump 23 for the resin, the proportioning pump 29 for the resin, the feed pump 43 for the isocyanate, the proportioning pump 49 for the isocyanate, and the pump 97 for the diluent. According to the present invention, these are all driven by a common drive chain from a single motor 193 mounted on the upper side of base plate 103. Motor 193 drives stepdown gearing (not shown), which in turn drives a shaft 161 that extends down through base plate 103 and is fixedly secured to a drive sprocket 163. See FIG. 6 of the drawings, which is a bottom plan view of the machine of the present invention, that is, from the underside of base plate 103. Drive sprocket 163, in turn, drives a single chain 165 that is trained about and drives the sprockets 107 and drive shafts 105 of the feed pumps 23 and 43, the drive sprockets 117 and drive shafts 115 of the proportioning pumps 29 and 49, and the drive sprocket 167 and drive shaft 169 of the diluent pump 97. Spring-urged tensioning sprockets 171 bear against chain 165 to maintain the proper tension therein. Base plate 103 is spaced above and supported on any desired substrate such as a floor, by means of legs 173 which can terminate downwardly in any desired support, e.g. wheels or casters.

The use of a single drive chain 165 has several advantages. In the first place, the chain, which may be any conventional drive sprocket chain with metal links which may for example by coated or clad with polytetrafluoroethylene, is inextensible and so it transmits drive to all the components at a precisely predeterminable velocity. In the second place, the use of a common drive chain from a single drive sprocket to all of the driven sprockets, insures that all five pumps will operate in unvarying ratio to each other, whereby the proportions of the pumped components are maintained constant. In the third place, a very simple drive arrangement is provided which, by virtue of its location beneath the base plate, is well protected but at the same time easily accessible for maintenance and repair without disassembly of the other parts of the machine that are mounted on the upper side of the base plate.

HEATING THE PUMPED LIQUIDS

It is often desirable to heat the pumped liquids. For example, when the pumped liquids are mutually reactive, as in the case of resin and isocyanate, then in certain cases the reaction is initiated by heating the pumped liquids to a predetermined temperature, e.g. up to 60° C. Broadly, the heating of said pumped liquids is conventional, as are the temperatures to which they are heated. However, the present invention provides new means for heating to those conventional temperatures, and new controls for achieving and maintaining those temperatures.

Figure 7:
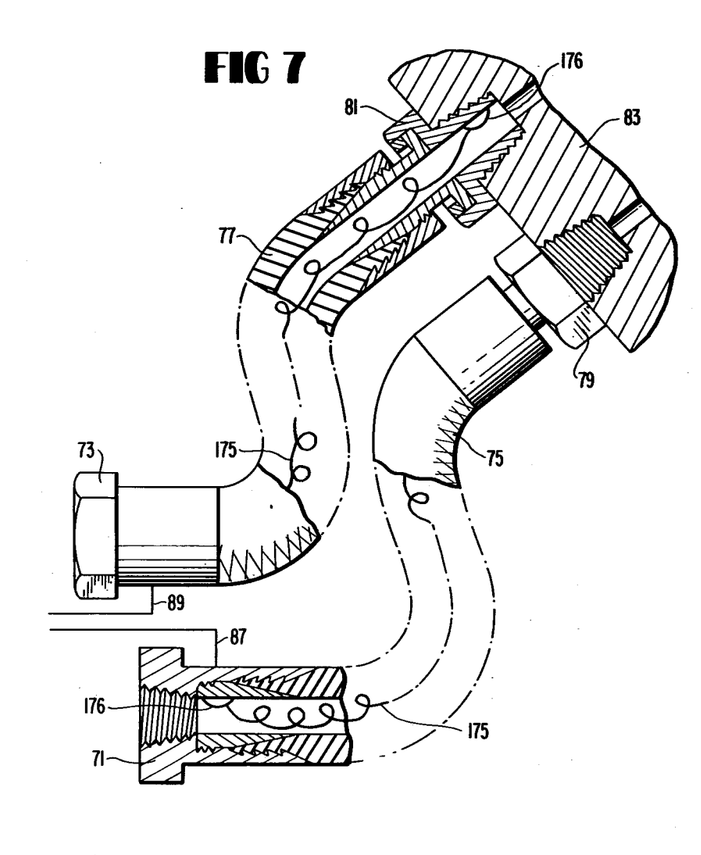
FIG. 7 is a view partly in cross section and with parts broken away, of the hose heater system of the present invention.
Figure 8A:
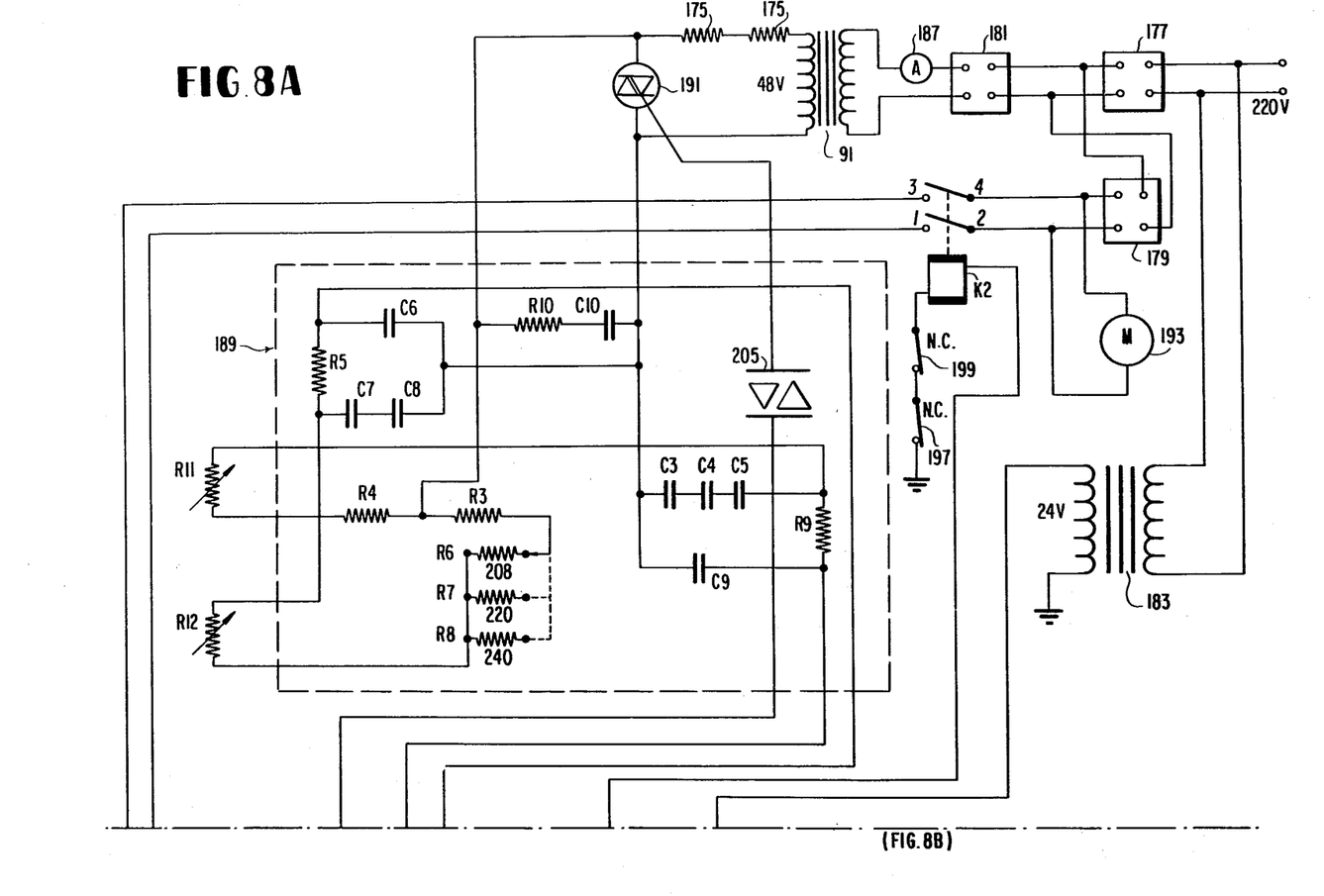
FIGS. 8A and 8B together show a circuit diagram of the feeder of the present invention.
Figure 8B:
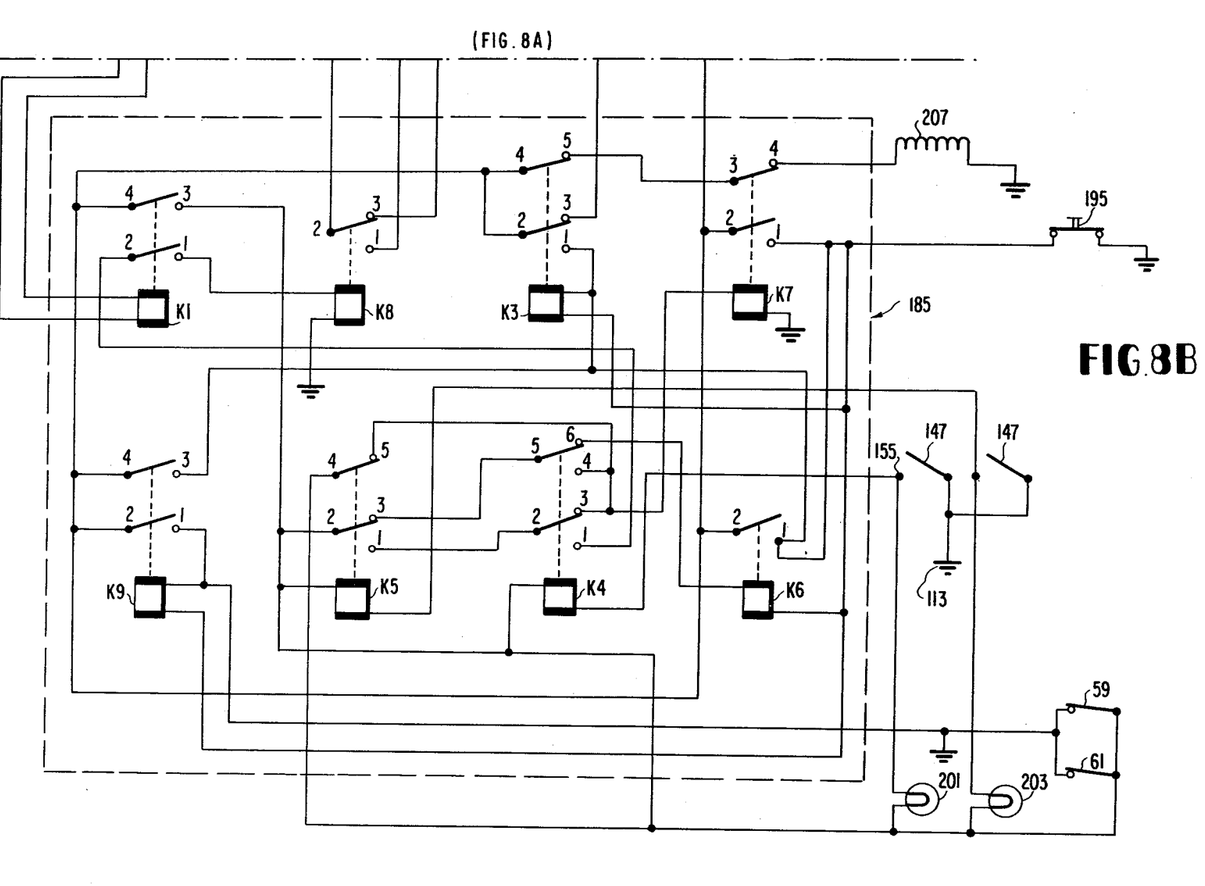

The new heating means of the present invention are best seen in FIG. 7; and the new controls are best seen in the circuit diagram which collectively comprises FIG. 8.

Referring first to FIG. 7, there is shown partly in section and partly broken away, the two heated hoses 75 and 77 which were broadly shown in FIG. 1. These hoses have couplings 71 and 73, respectively, at their upstream ends and couplings 79 and 81, respectively, at their downstream ends, by which they are detachably interconnected to the head 83 of the gun 85. The hoses and their couplings are entirely conventional as thus far described; and the head 83 of the gun 85 is no way modified.

The novel structure of the heated hoses, comprises their heating means, in the form of immersed wire coils 175, one disposed in each hose 75 and 77. Each coil is secured at opposite ends as by solder or other means of securement at 176 to the adjacent fitting. The hoses 75 and 77 are of conventional material, e.g. reinforced polytetrafluoroethylene or nylon; but the wire coils 175 are assembled to the fittings prior to assembly of the fittings on the hoses, so that the heat of soldering does not damage the hose.

Each coil 175 is helical, and, for example, for a 10 mm. inside diameter hose and an intended thru-put of 5 kg. per minute of liquid, may be copper wire of 1.5 mm. diameter coiled in such a manner that 50 running mm. of the wire extend over 25 mm. of the length of the hose. The coils 175 are free in their respective hoses, and are bonded as by soldering only at their ends. Thus, the coils within the hoses are free to move to a limited extent within the hoses. Also, the diameter of the coil is preferably a little smaller than the inside diameter of the hose. Thus, for example, for a hose whose inside diameter is 10 mm. the outside diameter of the coil might be 8 mm.

The hose heating circuit thus is through the secondary of the transformer 91, in series through the conductor 89, the coupling 73, the coil 175 within hose 77, coupling 81, head 83, coupling 79, the coil 175 in hose 75, coupling 71, and conductor 87, back to the secondary of the transformer via certain other circuit elements that will be described hereinafter. The coils in the two hoses are thus in series with each other, so that simultaneous operation is insured. Moreover, because the isolation transformer isolates and steps down the voltage to, say, 48 V, it is altogether unobjectionable to have the head 83 of the gun in circuit between the two hose heating coils 175.

It will of course be appreciated that the hoses 67 and 69 are not heated and no coils pass through them. Therefore, these relatively short lengths of hose serve as insulation between the electrically conductive couplings 71 and 73, on the one hand, and the couplings 63, 65 to the machine, on the other hand, thereby insulating the hose heating circuit from the machine, but not from the gun head, which latter is in that circuit.

It will also be appreciated, with regard to FIG. 7, that the proportions there shown are entirely schematic: the hoses could be thicker or thinner; and their lengths will ordinarily be a number of feet, in order to permit the operator to move the gun over a desirably great distance. Similarly, the hoses themselves will ordinarily be reinforced, in view of the high pressures involved, in any of a variety of conventional ways.

The hose heating arrangement of the present invention has a number of advantages in addition to those recited above. In the first place, it is quite simple to install: as the coil 175 is smaller than the inside diameter of the hose 75 or 77, it is a simple matter to thread a length of coil through the hose and to solder its opposite ends to the couplings just inside the mouths of the couplings.

In the second place, as the hose is heated internally, there is no need for a primary heater.

In the third place, as mentioned above, the hose coils are in series with each other, although it is also possible that they be in parallel or even in separate circuits.

In the fourth place, heating is quick and direct, because the liquids flow in direct contact with a length of wire about twice the length of the hose.

In the fifth place, the coiled configuration of the wire induces a certain amount of turbulence in the flowing liquid, which in turn promotes heat exchange at the interface between the liquid and the coils.

In the sixth place, the freedom of the coil to move relative to the hose within the hose, insures that even the sharpest or most frequent bending of the hose will not damage the coil: the hose thus serves to protect the coil.

Other advantages of the heating system of the pump liquids will become apparent from the following description of the circuit diagrams.

ELECTRICAL CONTROLS - LOGIC CIRCUIT

Primary voltage of 220 V AC single phase is supplied to a main circuit breaker 177, which in turn supplies current to a motor circuit breaker 179 and a hose heat transformer circuit breaker 181. Primary voltage is also supplied to the primary of a transformer 183 whose grounded secondary supplies current to a logic module 185 whose functions will be described in detail hereinafter.

Hose breaker 181 supplies current through an ammeter 187 to the primary of the hose transformer 91 whose secondary at 48 V is controlled by the hose circuit board 189 and a triac 191, which, as is conventional in the art, comprises a pair of silicon control rectifiers mounted in anti-parallel with a common gate.

The motor breaker 179 supplies current to the motor relay K2 and to the motor 193.

In logic module 185 there are a number of other relays, namely, a relay K1 which is the 220 V relay; K3 which is the motor stop relay; K4 which is the relay for the isocyanate proportioner pump 49; K5 which is the relay for the resin proportioner pump 29; K6 which is a conventional adjustable time delay relay which, in the illustrated embodiment, is set for three minutes; K7 which is another conventional adjustable time delay relay which, in the illustrated embodiment, is set for two seconds; K8 which is the hose heat control relay, and K9 which is the liquid supply relay.

With the machine plugged in, 24 V from the stepdown transformer 183 is applied to pin 4 of relay 1, to pins 2 and 4 of relay 3, to pin 2 of relay 6, to pin 2 of K7 and to pins 2 and 4 of K9. The other side of the secondary of transformer 183 is applied to chassis ground and each of K2, K7 and K8 has a grounded contact. On the other hand, K3, K6 and K9 are connected to chassis ground indirectly through reset push button 195.

The switch illustrated in FIG. 5, which is shown in the closed position corresponding to full flow through the associated pump 29 or 49, is a flow mode control switch; and there is one for each of the proportioning pumps 29 and 49. The isocyanate flow control switch is connected to actuate relay K4 while the resin flow control switch is connected to actuate relay K5. When main breaker 177 is on, all relays are deenergized except for motor control relay K2 which is supplied with 24 V from normally closed pin 3 of stop relay K3.

Then when motor control breaker 179 is turned on, the motor 193 starts to run because the motor control relay is energized. At the same time, however, the motor breaker supplies 220 V to the 220 V relay K1 to energize it. With only the 220 V relay K1 energized, 24 V is applied from pin 3 of K1 to the high and low pressure switches 59, 61, 197 and 199, and also to the isocyanate and resin relays K4 and K5. But as the pumps 29 and 49 are stopped, no pressure has been developed. Therefore, the low pressure switches 59 and 61 remain closed and supply 24 V to K9 and its pin 1 to energize K9.

With liquid supply relay K9 energized, its pin 3 applies 24 V to stop relay K3 to energize it. This in turn removes the 24 V from the normally closed contact of pin 3 of K3, which supplies 24 24 V to the motor control relay K2. This de-energizes K2, which stops the 220 V at pins 1 and 3 of K2 to turn off the motor 193.

At this time, K3 is held energized by its own pin 1, which supplies 24 V to K3, which is grounded through the chassis by reset button 195, as previously explained. K1 is de-energized because 220 V is no longer being supplied to K2 because it is de-energized.

When normally closed reset button 195 is depressed, that is, opened, it opens the circuit from K3 and K9 to chassis ground, so as to de-energize both of K3 and K9. As long as button 195 is held depressed, these relays remain de-energized which, in turn, energizes K2 to turn on motor 193 and activate K1. If the reset pushbutton 195 is released before the feed pumps 23 and 43 come up to pressure above the base pressure of, say, 15 psig, relays K3 and K9 will energize again, cutting off the power to the motor 193. Therefore, button 195 must be held depressed until operating pressures are achieved and low pressure switches 59 and 61 open. If the outlet pressure to the supply hoses exceeds, say, 1200 psi, then the high pressure switches 197 and 199, which are located anywhere downstream of pumps 29 and 49, will open, thus causing K2 to deactivate, which in turn shuts the motor off. This condition continues until the outlet pressure falls below, say, 1200 psi, whereupon K2 reactivates.

Once the machine is running at normal pressures, and 24 V is applied to relays K4 and K5 to monitor flow conditions and control high heat and low heat capabilities. With both of pumps 29 and 49 at pressure, in the idle flow mode, K4 and K5 are de-energized. 24 V from pin 3 of K1 is applied to K5 and its pin 2. With K5 de-energized, normally closed pin 3 of K5 applies 24 V to pin 5 of K4. With K4 also de-energized, normally closed pin 6 thereof applies 24 V to three-minute timer relay K6 to start the timer. If nothing changes for three minutes, the timer activates, giving pin 1 of K4 24 V to apply to stop relay K3 to energize it which de-energizes relay K2 and turns off the motor.

When K4 and K5 are actuated, that is, when pumps 29 and 49 are pumping under full flow conditions, then both of the flow mode switches shown in FIG. 5 will be closed and the corresponding signal lights 201 and 203 will be lighted. But when K5 is de-energized, 24 V is removed from its normally closed pin 3, which de-actuates K6 via K4, stopping the three-minute timer. 24 V is now applied to pin 1 of K5, which applies 24 V to pin 2 of K4. With K4 also energized, this 24 V is applied to pin 1 of K4 and thus sent to pin 2 of K1.

With K1 energized, its pin 1 receives the 24 V and applies it to K8, thereby energizing K8. This puts the heat circuit board 189 in a high heat mode, to be explained in detail later, if hose breaker 181 is on.

But when the pumps 29 and 49 return to the no-flow mode, and their corresponding flow mode switches shown in FIG. 5 are open, then K4 and K5 are de-energized because chassis ground is no longer supplied by those flow mode control switches. This de-energizes K8 to return heat circuit board 189 to a low heat mode, to be explained in detail later, if hose breaker 181 is on. With K4 and K5 de-energized, K6 is energized and the three-minute timer starts again.

If only one swash plate 125 is fully tilted, then the other pump will deliver at less than its intended flow rate, and the two streams will be out of proportion relative to each other. This can happen, for example, if the supply runs low in container 1 or 3, of if there is a blockage in one of the conduits, or if for any other reason there is a partial or total failure of the supply of one of the liquids. Under these circumstances, only one of the flow mode control switches as shown in FIG. 5 will be closed, that is, activated. If it is, for example, the resin control switch which alone is activated, then only the resin relay, K5, will be energized. This removes 24 V from the normally closed pin 3 of K5 to stop the three minute timer but closes the normally open pin 1 of K5 to send 24 V to pin 2 of the isocyanate relay K4. With K4 de-energized, 24 V is placed on its normally closed contact pin 3, whence it actuates K7. If this condition exists for more than two seconds, K7 energizes, sending 24 V from its pin 2, to pin 3 of K3, which energizes K3 to stop the motor 193.

But if the resin flow mode control switch deactivates before two seconds, then K5 de-energizes and stops the two-second timer and goes back to the no-flow condition and starts the three-minute timer again. If the isocyanate flow mode control switch activates before the two seconds has expired, and the resin flow mode continues, then both K4 and K5 energize. This removes 24 V from the two-second timer and applies it to K1 to go into the high heat mode, by energizing K8, which is the normal flow condition.

But if the isocyanate flow mode control switch alone is activated, then the corresponding relay K4 alone is energized. In this manner, the resin relay, K5, supplies 24 V from its pin 3 to pin 5 of K4. With K4 energized, 24 V is applied to pin 4 of K4, and thence to two-second relay K7 to energize it. As in the case of K5, so also in the case of K4, if K4 is de-energized before two seconds, the circuit goes back to the normal no-flow condition, but if K5 is energized, then normal flow conditions prevail and neither timer runs.

Normal flow conditions thus can previal without any time limit, so long as trigger valve 86 is pressed. Air under control of a conventional air solenoid 207 is thus supplied to the conventional piston that retracts the conventional valve rod in the conventional gun 85 to effect dispensing.

In addition, a microswitch (not shown) can be provided within gun 85, operated by the rearward movement of the air piston to shut down the machine with a two-second delay when both pumps 29 and 49 are out of proportion at the same time while dispensing is taking place.

ELECTRIC CONTROLS - HOSE HEAT CIRCUIT

Passing reference was made above to the high heat and low heat modes of the hose heat circuit, which is indicated in the drawings by the hose heat module 189 with its associated relay K8. This refers to the fact that according to the high heat mode, a substantially greater quantity of heat is applied by electric resistance heating to the liquids when they are flowing through the conduits 75 and 77, than when they are not flowing. The former case is the high heat mode and the latter case is the low heat mode. For example, 48 V can be applied at a current of about 60 amperes during high heat mode and the same voltage at a current of about 10 amperes during low heat mode. Broadly speaking, high heat mode occurs only when both pump stops are on their contacts as seen in FIG. 5, and motor 193 is running, and heat circuit breaker 181 is on. But low heat mode is independent of motor operation and occurs when the hose breaker 181 is manually actuated, for example for warm-up prior to motor operation. Also, when motor 193 cuts out, the low heat mode continues. Furthermore, the de-activation of either one of relays K4 and K5 will switch the circuit from high heat to low heat.

Thus, when hose breaker 181 is turned on, 220 V is applied to transformer 91, the 48 V secondary of which is connected directly to one side of the heated supply hoses, the other side of the 48 volt secondary of transformer 91 being connected through triac 191 to the other side of the heated hoses, whereby triac 191 controls the amount of current at 48 V which flows through the supply hoses, that is, high current at high heat mode and low current at low heat mode. Triac 191 is controlled by circuitry adjusted for high and low current flow, as determined by the pins 1, 2 and 3 of heat control relay K8. Normally closed pin 3 of K8 maintains the low current setting. But when K8 is energized by K1, then normally open pin 1 of K1 applies gate for the high heat mode.

Referring now in greater detail to the circuit diagram associated with the heat control module 189, it will be appreciated that adjustment of each of the heat control modes is effected through R11 and R12, which thus forms the controlling portion of the gating or switching network that allows triac 191 to conduct in its two states, high or low. Triac 191, in turn, can best be described as a fast switching device. The longer the triac is switched on during a single cycle of the 50 or 60 hertz power source, the more current is allowed to flow from the hose element through the triac and back to the power source, for electric resistance heating of the liquids in the hoses. Conversely, the less time the triac is switched on, the less current is allowed to flow through the hose heater coils.

The rest of the gating network that connects to R11 and R12 is a simple resistance-capacitance timing circuit that forms a pulse of energy that is discharged through diac 205, which is a bi-directional diode that can conduct power in either direction (negative or positive). This enables triac 191 to conduct during both halves of the 50 or 60 hertz cycle. R6, R7 and R8 are range-limiting resistors for the low heat state, which limit the amount of possible conduction of triac 191 during that low state. In FIG. 8, R6, R7 and R8 are labelled 208, 220 and 240, respectively, which means that it is thus possible to control the range limiting the low heat state at various line voltages. The output of diac 205 connects to the gate of triac 191. C10 and R10 thus form a dV/dT network, (dV/dT being the differential of rate of change of voltage with time) that protects the triac from any inductive transient power surges during turn-on or turn-off. Thus this network serves in effect as an inductive shock absorber.

During the low heat mode, the gating signal passed to triac 191 is from R3 through either R6, R7 or R8, and through the adjustable rheostat R12. Once the signal level is past R12, the pulse-shaping network (C 7-8, R5, C6) develops the gating pulse. The gating pulse now travels to pin 3 of K8. The pulse passes through pin 2 of K8 and returns to module 189 to diac 205. The pulse now conducts through diac 205 and forces triac 191 to conduct.

But during the high heat mode, the gating signal path is through R4 and adjustable rheostat R11. The signal level now enters the gate pulse shaping network (C 3-5, R9, C9) and exits through pin 1 of K8. Due to the fact that a high heat mode exists, the gate pulse is allowed to pass through pin 2 of K8 and continue to diac 205. Triac 191 now conducts in the high heat mode.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit aof this invention, as those skilled in this art will readily understand. Such modifications and variations are considered to be within the purview and scope of the present invention as defined by the appended claims.

What is claimed is:

1. In a feeder for apparatus for ejecting a mixture of a plurality of liquids, comprising a plurality of proportioning pumps one individual to each of the liquids, means to supply a separate said liquid to each of said pumps, a flexible hose individual to each said pump for conveying the pumped toward said apparatus, means to heat the liquids passing through said flexible hoses, said heating means comprising a wire disposed within each hose and directly bathed by the liquid in each hose and extending lengthwise of each hose, and means to pass an electric current through said wires to heat said wires and hence said liquids by electric resistance heating, said apparatus including an electrically conductive metal gun head to which said hoses are connected at spaced points; the improvement in which said wires in said hoses are in electrical series with each other through said gun head.

2. A feeder as claimed in claim 1, said hoses having electrically conductive fittings at opposite ends thereof, said wires being in electrical contact at their opposite ends with said fittings.

3. A feeder as claimed in claim 1, said wires being free to move within and relative to the inner side walls of said hoses.

4. A feeder as claimed in claim 1, in which said wires are in the form of helical coils.

5. A feeder as claimed in claim 4, the outer diameter of said coils being less than the inner diameter of said hoses.

6. A feeder as claimed in claim 1, and means electrically insulating said wires from said pumps.

7. In a feeder for apparatus for ejecting a mixture of a plurality of liquids, comprising a plurality of proportioning pumps one individual to each of the liquids, motor means to drive said pumps, means to supply a separate said liquid to each of said pumps, a flexible hose individual to each said pump for conveying the pumped liquid toward said apparatus, and electric resistance heating means for heating the liquid in each said hose; the improvement comprising means to supply electric current to said electric resistance heating means at two distinctively different rates comprising a high rate during a high heat mode and a low rate during a low heat mode, switch means for switching said electric current supply means between said high and low rates of supply, and means responsive to actuation of said motor means to switch said switch means to supply electric current at said high rate and to inactivation of said motor means to switch said switch means to supply electric current at said low rate independently of the temperature in said hoses.

* * * * *